United States Patent [19]

Tsuchida

[11] Patent Number: 4,790,226
[45] Date of Patent: Dec. 13, 1988

[54] APPARATUS FOR CUTTING BLIND SLATS

[75] Inventor: Kazuo Tsuchida, Shiga, Japan

[73] Assignee: Tachikawa Corporation, Japan

[21] Appl. No.: 906,164

[22] Filed: Sep. 10, 1986

[30] Foreign Application Priority Data

| Dec. 24, 1985 | [JP] | Japan | 60-291195 |
| Dec. 24, 1985 | [JP] | Japan | 60-291196 |
| Dec. 24, 1985 | [JP] | Japan | 60-291197 |
| Dec. 26, 1985 | [JP] | Japan | 60-294696 |
| Dec. 26, 1985 | [JP] | Japan | 60-294697 |
| Dec. 27, 1985 | [JP] | Japan | 60-299167 |

[51] Int. Cl.$^4$ .............. B23P 23/00; B23D 23/00
[52] U.S. Cl. .................................. 83/208; 83/40; 83/52; 83/255; 83/926 R; 29/245
[58] Field of Search .............. 83/208, 213, 214, 255, 83/926 R, 40, 52; 29/24.5

[56] References Cited

U.S. PATENT DOCUMENTS

| 2,827,686 | 3/1958 | Adelman | 29/24.5 |
| 3,555,864 | 1/1971 | Wegner | 29/24.5 X |
| 4,070,937 | 1/1978 | Off et al. | 83/208 X |
| 4,420,862 | 12/1983 | Edixhoven | 29/24.5 |
| 4,639,987 | 3/1987 | Georgopoulos | 29/24.5 |

Primary Examiner—Donald R. Schran
Attorney, Agent, or Firm—Ostrolenk, Faber, Gerb & Soffen

[57] ABSTRACT

Disclosed is an apparatus for cutting blind slats, including a conveying device for sequentially conveying a slat material and a cutting device turned on and off in synchronism with the conveyance of the slat material so as to form slats of a desired length, wherein the improvement is characterized by comprising: an input device having means for entering the length of a slat; a control device for converting the output signal of the input device to pulse signals corresponding to the slat length entered and outputting them; and a motor rotated on the basis of the pulse signals output from the control device so as to convey the slat material by predetermined lengths.

10 Claims, 8 Drawing Sheets

APPARATUS FOR CUTTING BLIND SLATS

BACKGROUND OF THE INVENTION

1. Field of the Invention

The present invention relates to an apparatus for cutting slats of predetermined length in the production of a blind.

2. Description of the Related Art

In known slat cutting apparatuses, a slat material formed with a long and continuous thin sheet of aluminum is fed by feed rollers driven by a motor, the amount of feed thereof being detected by position detecting means such as a limit switch which is mounted at a predetermined position, and a cutter is actuated after the slat material has been fed by a predetermined distance so as to cut the slat material in predetermined lengths.

In such an apparatus, it is necessary to change the installation position of the position detecting means such as a limit switch which is located along the travelling passage of the slat material, every time slats of different sizes are manufactured. The width of manufactured slats has become narrower recently, and such slats are not so strong as the conventional wider slats. Therefore, if the position detecting means is of a type which is actuated by being pressed by the slat, the slat may be broken or bent and deformed.

Figure 11:
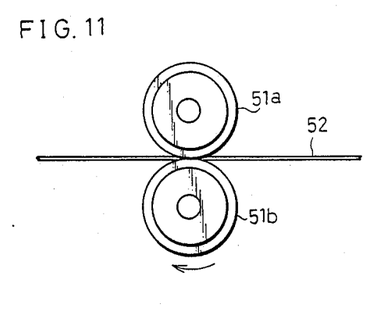
FIG. 11 is a front elevational view of feed rollers employed in a conventional apparatus.
Figure 12:
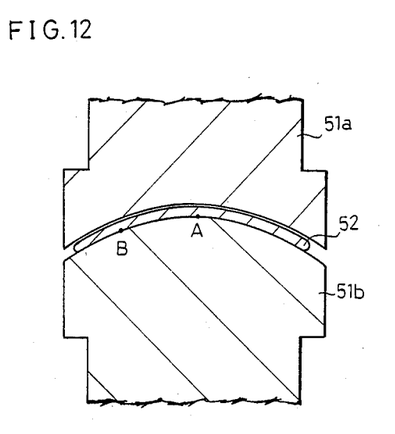
FIG. 12 is a fragmentally enlarged and cross-sectional view of the feed rollers of FIG. 11.

Generally, conventional slat cutting apparatuses, such as the one shown in FIG. 11, have a pair of feed rollers 51a and 51b which are respectively located above and below the slat material 52 and the lower roller 51b is driven to feed the slat material 52 by a predetermined distance. As shown in FIG. 12, however, the feed rollers 51a and 51b employed in the known apparatuses have concave and convex peripheral configurations that allow them to be fitted to the curved slat material 52, and the length of the outer periphery of the roller, therefore, becomes different at, for example, Points A and B. As a result, when conveying the slat material 52, slippage occurs relative to the slat material 52 at least one of Points A and B. In consequence, when the rotational frequency of the feed roller 51b is, for example, determined in accordance with the length of the outer periphery at Point A and the slat material 52 is bitten at Point B due to variations in the pressing force of the rollers 51a and 51b with respect to the slat material 52 or because of the dirt attached on the outer periphery thereof, an error occurs in the feeding length of the slat material to an extent that cannot be disregarded.

SUMMARY OF THE INVENTION

Accordingly, a primary object of the present invention is to provide an apparatus for cutting blind slats which is so improved as to be capable of conveying a slat material securely and of manufacturing slats of a predetermined length easily whilst having a simple structure. The related object of the present invention is to provide an apparatus for cutting blind slats which is capable of continuously manufacturing a plurality of slats of a length which is exactly the same as the desired length input.

Another object is to provide an apparatus for cutting blind slats which allows for a simple incorporative mechanism which is capable of cutting a slat material and of making lift cord holes in each slat.

A further object is to provide an apparatus for cutting blind slats which has a simple construction and which is capable of automatically take out cut slats.

A further object is to provide an apparatus for cutting blind slats which is capable of accurately making a hole through which a lift cord is to be passed at the center of a slat in the longitudinal direction thereof.

According to a first aspect of the invention, there is provided an apparatus for cutting blind slats which includes a conveying device for sequentially conveying a slat material and a cutting device turned on and off in synchronism with the conveyance of the slat material so as to produce slats of a desired length, wherein the improvement is characterized by comprising: an input device having means for entering the length of a slat; a control device having means for converting the output signal of the input device to pulse signals corresponding to the slat length entered and outputting them; and a motor rotated on the basis of the pulse signals output by the control device so as to convey the slat material by predetermined distances.

According to a second aspect of the invention, there is provided an apparatus for cutting blind slats which includes a conveying device for sequentially conveying a slat material such that in synchronism with the conveyance thereof the slat material is cut into slats of a desired length and through-holes for lift cords are made at both sides of the cut portion of the slat material, wherein the improvement is characterized by comprising: a frame extending in the direction of the movement of the slat material; a cutting metal mold mounted on the frame; a pair of perforating metal molds mounted on the frame at both sides of the cutting metal mold in the moving direction of the slat material in such a manner that the pair of perforating metal molds are separated by the cutting metal mold; and a mechanism for simultaneously actuating the cutting metal mold and the both perforating metal molds.

According to a third aspect of the present invention, there is provided an apparatus for cutting blind slats which includes a conveying device for sequentially conveying a slat material and a cutting device turned on and off in synchronism with the conveyance of the slat material so as to continuously form a plurality of slats of a desired length, wherein the improvement is characterized by comprising: means for removing the slats in one direction perpendicular to the direction of the movement of the slat material; and means for synchronizing the removing means to the actuation of the cutting device.

According to a fourth aspect of the present invention, there is provided an apparatus for cutting blind slats which comprises: a frame extending in the longitudinal direction of a slat material; a conveying device for conveying the slat material along the frame; a metal mold for cutting the slat material into slats of a predetermined length, the metal mold being disposed on the frame; a pair of end perforating metal molds for making through-holes for lift cords at both sides of the cut portion of the slat material, the metal molds being disposed on the frame in the direction of the movement of the slat material in such a manner as to be separated by the cutting metal mold; a center perforating metal mold for making a through-hole for a lift cord at the center of the length of the slat, the metal mold being disposed on the frame; means for removing the cut slat in a direction perpendicular to the direction of the movement of the slat material after each metal molds have been actuated;

and guide means for positioning the slat material in the breadthwise direction thereof before the metal molds are actuated and for allowing the movement of the slat in its removed direction after the metal molds have been actuated and before the removing means is actuated.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENT

Figure 1:
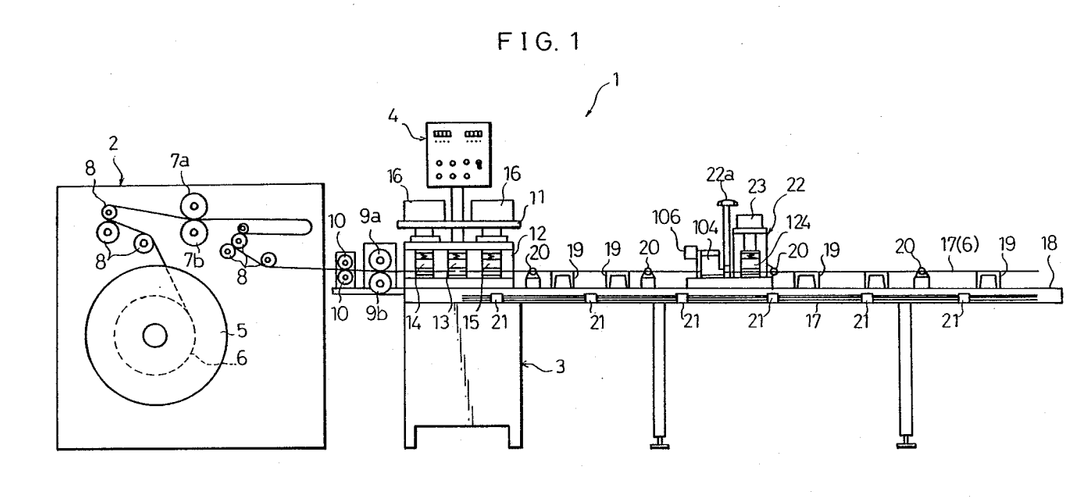
FIG. 1 is a front view of an apparatus for manufacturing slats for a blind according to the present invention.

An embodiment of the present invention will be described with reference to the accompanying drawings. Referring first to FIG. 1, a slat manufacturing apparatus 1 comprises: a forming device 2 which bends a plate-like slat material; a slat cutting device 3 which cuts the slat material which has been bent by the forming device 2 in predetermined lengths and makes through-holes in the slat material through which lift cords are passed; and an input device 4 having means for controlling the slat cutting device 3.

In the forming device 2, a slat material 6 made of a long and continuous thin aluminum sheet is wound around a coil receptacle 5. A pair of forming rollers 7a, 7b are provided at the upper portion of the forming device 2 so as to bend the slat material 6. The forming rollers are rotated by a driving motor 34 (see FIG. 10) provided in the forming device 2. The slat material 6 drawn from the coil receptacle 5 is led to the forming rollers 7a, 7b by a plurality of guiding rollers 8 so as to be pressed and bent.

A pair of feed rollers 9a, 9b constituting a conveying device are provided at one side of the cutting device 3 so that the slat material 6 which has been formed by the forming rollers 7a, 7b are gripped between the rollers and fed. The feed rollers 9a, 9b are driven by a stepping motor 35 (see FIG. 10) which is mounted behind the rollers. The slat material 6 is fed by the feed rollers 9a, 9b from the forming device 2 through a pair of guiding rollers 10 toward the cutting device 3. The amount fed is determined in accordance with the amount of rotation of the feed rollers 9a, 9b i.e., the rotation angle of the stepping motor 35.

Figure 2:
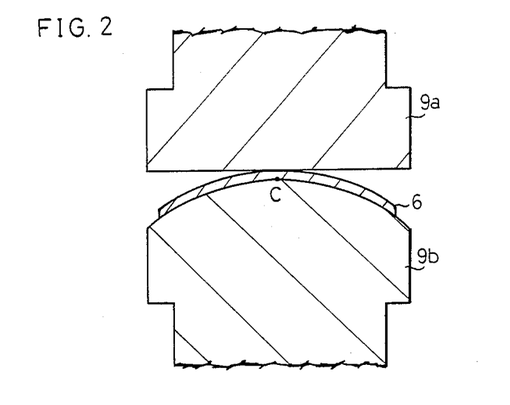
FIG. 2 is a fragmentally enlarged view of feed rollers employed in the apparatus of the present invention which conveys a slat material.

As shown in FIG. 2, the upper roller 9a which makes contact with the convex surface of the curved slat material 6 has a flat peripheral surface, while the peripheral surface of the lower feed roller 9b which makes contact with the concave surface of the slat material 6 is formed to be convex so as to fit thereto. The upper feed roller 9a is driven by the stepping motor 35. The slat material 6 is pressed between the lower feed roller 9b and the flat surface of the upper feed roller 9a at point C constituting the vertex of the lower feed roller while being conveyed by the feed rollers. The amount of the slat material 6 which is fed is determined on the basis of the length of the outer periphery of the roller 9b at point C.

The slat cutting device 3 includes a cutter 11 provided in the conveying passage of the slat material 6 behind the feed rollers 9a, 9b (at the right side as viewed in FIG. 1), which cuts the slat material 6 fed from the feed rollers 9a, 9b in predetermined lengths.

Figure 3:
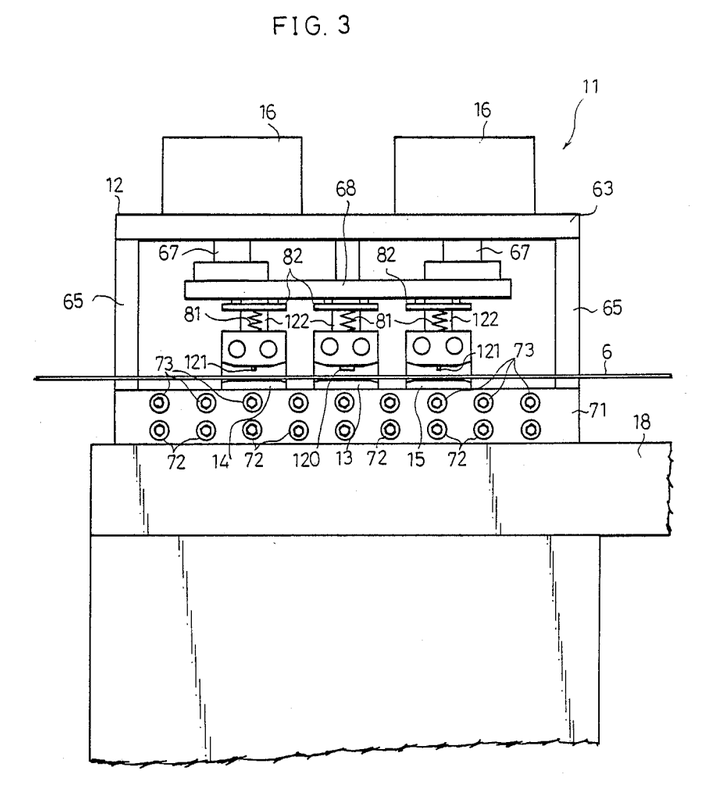
FIG. 3 is an enlarged front view of a cutter employed in the apparatus of the present invention, which cuts the slat material and makes holes for lift cord at both edges of each slat.
Figure 4:
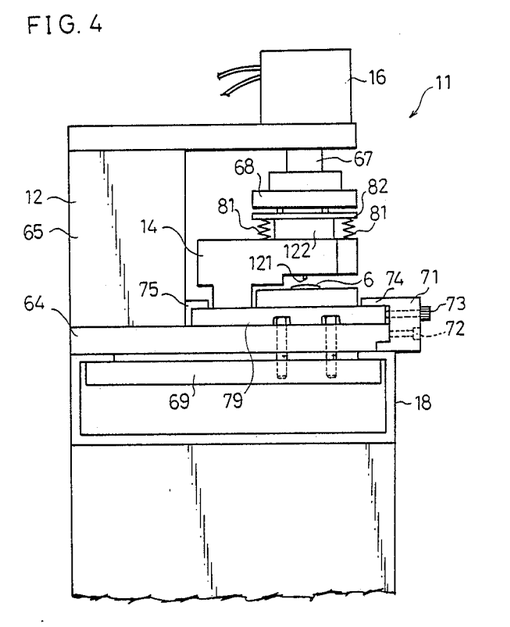
FIG. 4 is a side elevational view of the cutter of FIG. 3.

As shown in FIGS. 3 and 4, the cutter 11 has a frame 12 composed of an upper plate 63, a lower plate 64, and vertical plates 65. Fixed on the upper surface of the upper plate 63 are two air cylinders 16 operated by the compressed air sent from a pump 33 (see FIG. 10). A driving plate 68 serving as an engaging member is horizontally fixed to output shafts 67 between the lower ends of the air cylinders 16, so that it moves up and down in correspondence with the actuation of the output shafts 67 in a state wherein it is engaged in common with the moving portions of cutting and hole making metal molds 13 to 15 to be described later.

The lower plate 64 of the frame 12 is fixed on a support table 18 via fixing plates 69 at both ends thereof, as shown in FIG. 4. A front holder 71 is secured to the front end surface of the lower plate 64 by a plurality of fixing bolts 72, and the upper portion thereof forms a protrusion 74 projecting to the rear. A rear holder 75 having a substantially inverted L-shaped cross-section extends at the rear portion and on the upper surface of the lower plate 64 in such a manner that it faces the protrusion 74.

Figure 5:
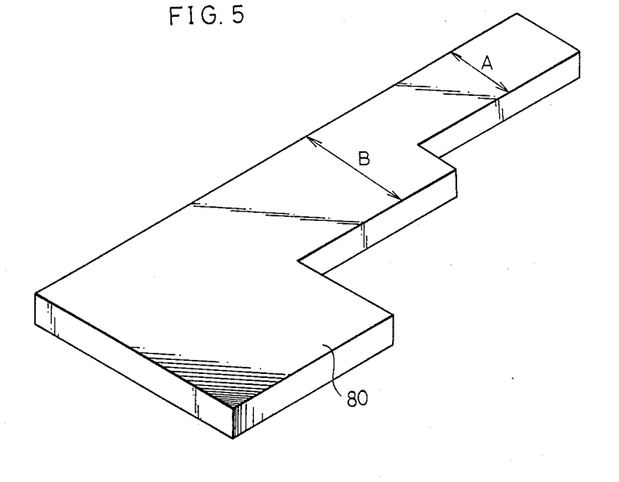
FIG. 5 is a perspective view of a defining member which determines intervals between a cutting metal mold and perforating metal molds which make holes at the edges of the slat.

As shown in FIG. 3, a cutting metal mold 13 is mounted on the lower plate 64 of the frame 12 at the central portion of its length, and metal molds 14, 15 for making holes at the ends of the slat material are provided at both sides of the metal mold 13. A seat 79 of the metal molds 13, 14 and 15 is supported, as shown in FIG. 4, by the front holder 71 and the rear holder 75 at the front and rear ends thereof in such a manner that the position thereof can be adjusted in the longitudinal direction. It can be fixed at a desired position by tightening fixing bolts 73 located at the upper stage of the front holder 71. Defining members 80 such as the one shown in FIG. 5 are provided between the cutting metal mold 13 and the metal molds 14, 15 for making holes at both ends whereby the distance between the metal molds is determined by using dimension A or B of the defining member 80. These defining members 80 are able to accurately retain the cutting metal mold 13 and the perforating metal molds 14, 15 at their respective positions.

The metal molds 13, 14 and 15 each have an elevating slider 122 which has an edge 120 or 121 located at the lower end thereof and a receiving plate 82 at the upper end thereof and which constitutes a moving portion of the metal mold. Generally, the receiving plates 82 are urged by the resilient force of coil springs 81 upward to a position where they abut against the driving plate 68. When the output shafts 67 of the air cylinders 16 are protruded and the driving plate 68 is thereby lowered in the state wherein the slat material 6 is inserted through the metal molds 13, 14 and 15, (as shown in FIG. 3), the sliders 122 are moved downward against the resilient force of the coil springs 81, and the slat material 6 is cut by the edge 120 of the cutting metal mold 13 to form a slat 17, while holes for lift cords are made before and behind the cut portion of the slat material by the edges 121 of the edge hole making metal molds 14, 15.

The support table 18 extends, as shown in FIG. 1, from the cutter 11 to the direction of the movement of the slat material 6, and has thereon a plurality of supporting members 19 to support the slat material 6 fed by the feed rollers 9a, 9b.

A perforator 22 operated by an air cylinder 23 is mounted on the support table 18 in the moving passage of the slat material 6. The perforator 22 has a metal mold 124 for making a hole at the central portion of a slat which has the same structure as those of the metal molds 14 and 15 of the cutter 11 which make holes at the ends of a slat. The perforator 22 is actuated simultaneously with the cutter 11 when it is necessary to make a hole for the lift cord at the central portion of the slat 17 in addition to the holes at both ends thereof. The position of the perforator 22 can be moved in the longitudinal direction of the apparatus of FIG. 1 along the support table 18 by operating a handle 22a which protrudes upwardly, so that the position of the central hole can be adjusted in accordance with the length of the slat 17.

Figure 7:
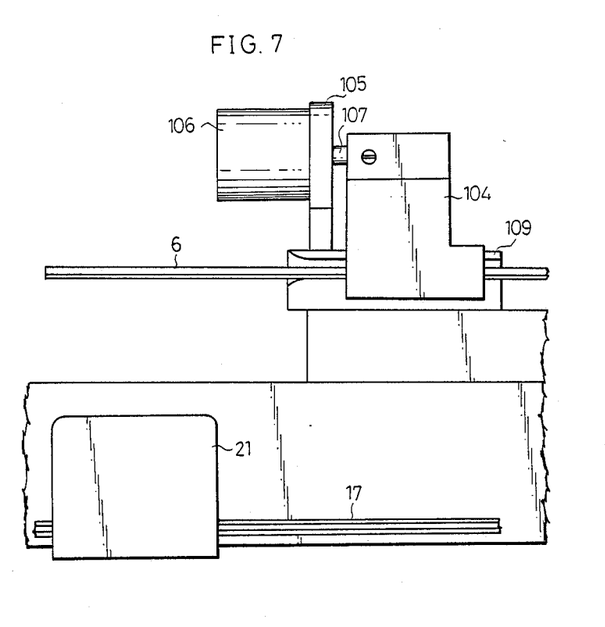
FIG. 7 is an enlarged front view of guide means employed in the apparatus of the present invention which positions the slat in the breadthwise direction thereof before the cutting and perforating metal molds are actuated.
Figure 8:
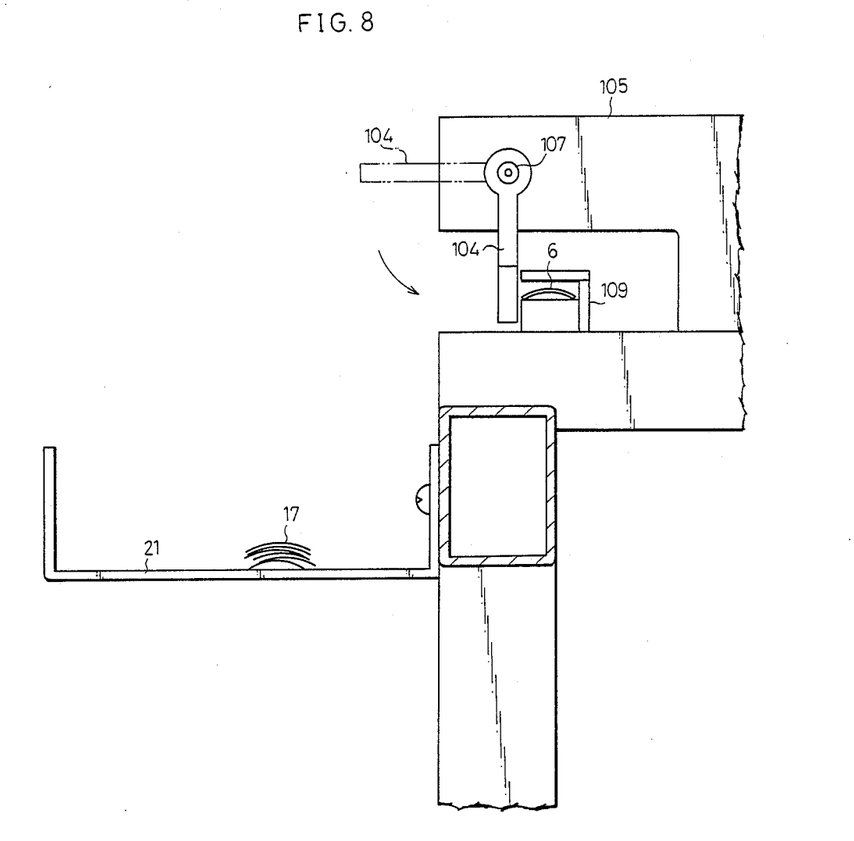
FIG. 8 is a side elevational view of the guide means of FIG. 7.

Guiding means for positioning the slat material 6 in the breadthwise direction is provided on the support table 18 adjacent to the perforator 22. As shown in FIGS. 7 and 8, a rotary actuator 106 operated by compressed air is fixed to a frame 105 vertically mounted at one side of the perforator 22. The rotary actuator 106 has an output shaft 107, and a guiding plate 104 is fixed at the distal end thereof. The guiding plate 104 is pivoted in correspondence with the actuation of the rotary actuator 106, as shown by the solid and dotted lines of FIG. 8, between its functioning position at which it faces the front edge of the slat material 6 and its non-functioning position at which it is separated therefrom. A guiding member 109 is provided along the moving passage of the slat material 6 at a position where it faces the perforator 22 so that it covers the upper side of the slat material 6 and opposes the rear edge thereof. The guiding member 109, together with the guiding plate 104, constitutes a guide means. Before being cut and perforated by the metal molds 13, 14, 15 and 124, the guiding plate 104 is pivoted to its functioning position, and the slat material 6 is covered by the guiding plate 104 and the guiding member 109 and positioned in the breadthwise direction thereof. After the slat material 6 has been cut and perforated, the guiding plate 104 is pivoted back to its non-functioning position so as to allow the cut slat 17 to be moved forward.

Figure 6:
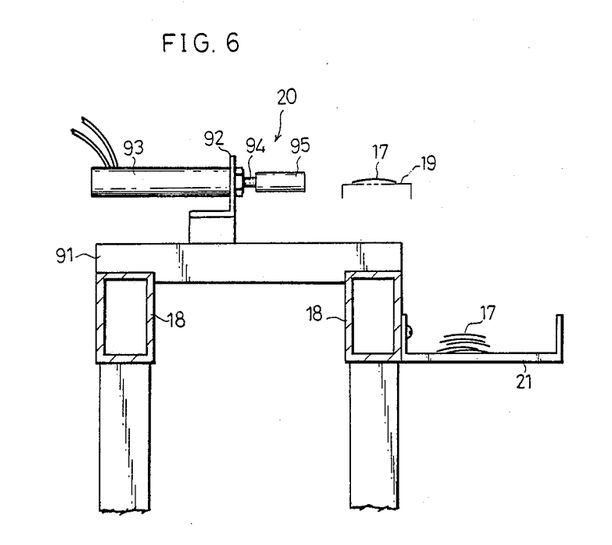
FIG. 6 is an enlarged side elevational view of a remover employed in the apparatus of the present invention and which has means for pushing out slats.

The cutting device 3 also includes a plurality of removers 20 mounted at suitable positions on the support table 18 which remove the cut and perforated slat 17 placed on the supporting members 19 in the lateral direction, i.e., in a direction perpendicular to the direction of the movement of the slat material 6 (see FIG. 1). Referring to FIG. 6, the removers 20 each have a base 91 movably supported on the support table 18, an air cylinder 93 horizontally mounted on the base 91 through a fitting 92, and a pushing rod 95 fixed to the front end of an actuating shaft 94 of the air cylinder 93. The cut and perforated slat 17 is positioned on the supporting members 19 disposed in front of the pushing rods 95 and, when the actuating shafts 94 of the air cylinders 93 are extended by the compressed air sent from the pump 33 after the guiding plate 104 has been pivoted to its non-functioning position, is then pushed sidewardly off the supporting members 19 and fall into a plurality of slat receptacles 21 for retreival where it is piled on top of one another by the forward movement of the pushing rods 95.

Figure 9:
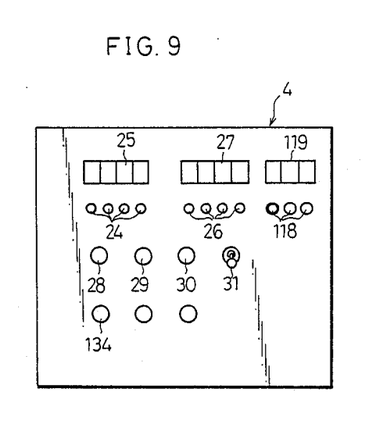
FIG. 9 is an enlarged front view of an input device employed in the apparatus of the present invention which has means for inputting the length of a slat and the height of a blind.

As shown in FIG. 9, the input device 4 includes: input keys 24 for entering the required length of a slat 17; a display portion 25 for displaying the value entered by the input keys 24; input keys 26 for entering the required height of a blind; a display portion 27 for displaying the value entered by the input keys 26; input keys 118 for correcting the length of a cut slat; a display portion 119 for displaying the value entered by the input keys 118; a power switch 28 for supplying power to the slat manufacturing apparatus 1; a start switch 29 for starting the operation thereof; a stop switch 30 for stopping the operation thereof; a selection switch 31 for selectively turning on and off the perforator 22; and a one-cycle-operation switch 134 for stopping the stepping motor 35 after a slat is formed on the basis of the value entered.

Figure 10:
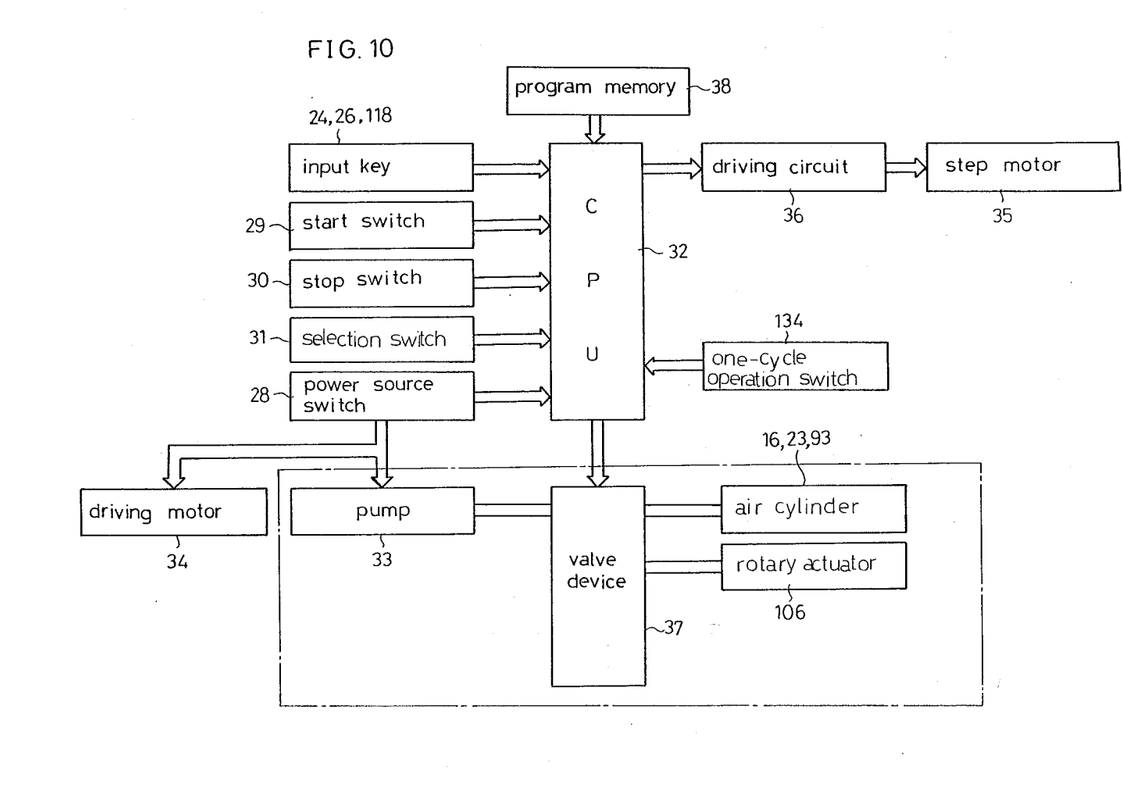
FIG. 10 is a block diagram of an electric and pneumatic circuits of the slat cutting apparatus of the present invention.

As shown in FIG. 10, the output signals of the above-described input means are input to a CPU 32 in the input device 4 which acts as a control unit. The power switch 28 is connected to the pump 33 which sends compressed air to the air cylinders 16, 23 and 93 which actuate the cutter 11, perforator 22 and removers 20, and to the rotary actuator 106 for the guide means. The power switch 28 is also connected to the motor 34 which drives the forming rollers 7a, 7b. Thus, all these components are turned on by operating the power switch 28.

The CPU 32 is connected at its output side to the stepping motor 35 which drives the feed rollers 9a, 9b through a driving circuit 36, as well as to a valve device 37 which opens and closes a pneumatic circuit between the pump 33 and the air cylinders 16, 23, 93 and the rotary actuator 106.

A program memory 38 connected to the CPU 32 is constituted by a read-only memory (ROM) which stores a program for operating the CPU 32.

Operation of the thus-constructed slat manufacturing apparatus 1 will be hereinunder described in detail.

First, the height of a blind to be manufactured and the length of a slat 17 are entered by the input keys 26 and 24, respectively, before the slat manufacturing apparatus 1 is started. When the height is entered, the CPU 32 calculates accordance with the program stored in the memory 38 the number of slats required in a set of blinds to be manufactured on the basis of the width of the slats (15 mm, for example) produced by the slat manufacturing apparatus 1 and the entered height of the blind.

If the slats of the blind to be manufactured are so long as to require the provision of a hole for a lift cord at the central portion thereof, the apparatus is set to a mode by operating the selection switch 31 in which the perforator 22 is actuated simultaneously with the cutter 11. The perforator 22 is then moved by the handle 22a to a desired perforating position. When it is necessary to change the position of the end holes for the lift cords, i.e., the distance of the end holes from the slat ends due to the required length of the slat, the metal molds 14 and 15 for making perforations at the ends are moved on the lower plate 64 by loosening the fixing bolts 73 aligned in the upper stage of the front holder 71. The intervals between the cutting metal mold 13 and both perforating metal molds 14, 15 are suitably adjusted by using the defining members 80. After the adjustment, the defining members are fixed by tightening the fixing bolts.

Subsequently, an operator presses the one-cycle operation switch 134, and the CPU 32 outputs to the driving circuit 36 a number of pulse signals corresponding to the slat length entered and thereby rotates the stepping motor 35 by a predetermined rotational angle sd as to rotate the feed rollers 9a, 9b and feed the slat material 6 rightward as viewed in FIG. 1. The CPU 32 next outputs a signal to the valve device 37, actuates the rotary actuator 106 of the guide means and pivots the guiding plate 104 from the non-functioning position to the functioning position so as to position the slat material 6 in the breadthwise direction thereof. The CPU 32 then actuates the air cylinders 16 and 23 and operates the cutting metal mold 13 and the perforating metal molds 14, 15 and 124 simultaneously, thereby cutting a predetermined length of the slat material 6 to form the slat 17 and also making holes for the lift cords at both ends and at the center thereof. During the cutting and perforation operation, the guide means prevents the slat material 6 from moving in the breadthwise direction thereof. In consequence, the holes can be accurately made at the precisely central positions of the width of the slat. At this time, the guide means is so operated as not to interfere with the removing operation of the slat 17 by the removers 20.

After the slat 17 having a predetermined length has been formed, the CPU 32 outputs a signal to the valve device 37 and actuates the air cylinders 93 of the removers 20 so as to push the slat 17 placed on the supporting members 19 into the slat receptacles 21 by extending the pushing rods 95 outwardly. At this time, the air cylinders 93 are driven in synchronization with the cutter 11 and the perforator 22 through the valve device 37 controlled by the CPU 32, enabling an accurate removal operation to be conducted at a predetermined timing after the cutting and perforation of the slat.

Once one slat 17 has thus been completed after one cycle of operation, the operator measures the same to establish whether its length deviates from that entered beforehand. If any error exists, he enters the percentage value representing the ratio of the error to the set value by depressing the input keys 118. The CPU 32 thereby drives the stepping motor 35, when the operation is started afterwards by depressing the start switch 29, in accordance with the number of pulses which has been modified on the basis of the corrected value. In consequence, the slat material 6 can be fed by the rotation of the feed rollers 9a, 9b by a distance which exactly agrees with the value entered first. The processes of feeding, cutting, perforation and removal are thereafter sequentially repeated, so that a predetermined number of slats 17 can be successively manufactured.

Thus, in the slat cutting device 3 of this invention, the stepping motor 35 is rotated in accordance with the pulse signals which correspond to the required length of the slat 17 by entering that length through the input keys 24 beforehand. The slat material 6 is thereby moved by a predetermined length, and is then cut by the cutter 11 to form a slat 17 of a predetermined length. In consequence, the apparatus need not incorporate detecting means for detecting the amount of movement of the slat material in the moving passage thereof nor a mechanism for adjusting the position of the detecting means in accordance with the required length of the slat. In addition, since the amount of movement of the slat material 6 is determined by the rotational angle of the stepping motor, it is possible to consistently move the slat material 6 in a stable condition regardless of its structural strength. The length and the number of slats can be easily set by the input keys 24 and 26 on the front of the input device 4.

Even if the length of the actually cut slat deviates from the required length entered due to a change in the pressing force of the feed rollers 9a, 9b relative to the slat material 6, the condition of the painting on the surface of the slat material 6, or dirt attached to the outer peripheries of the rollers 9a, 9b, it is possible, as described before, to cut the slats 17 to a length which accurately agrees with the desired length by correcting the error through the input keys 118. In addition, when feeding the slat material 6, it is pressed between the upper and lower feed rollers 9a, 9b at point C on the lower feed roller 9b while being conveyed, as shown in FIG. 2, and this enables the slat material 6 to be conveyed by an accurate amount in accordance with the set value without being affected by any change in the pressing force of the rollers 9a, 9b or dirt on the outer peripheries thereof.

In cutting and perforating the slat, the cutting metal mold 13 and the end perforating metal molds 14, 15 are driven by the common air cylinders 16, thereby allowing for simultaneous operations of cutting and perforation of the slats 17 despite the simple structure of the apparatus. The position of the end perforating metal molds 14, 15 can be moved in the longitudinal direction, thereby making it possible to easily set the distance of the lift cord holes from the both ends of the slat particularly when a very short slat is to be made.

As many apparently widely different embodiments of this invention may be made without departing from the spirit and scope thereof, it is to be understood that the invention is not limited to the specific embodiments thereof except as defined in the appended claims.

I claim:

1. An apparatus for cutting blind slats, including: a conveying device for sequentially conveying a slat material; and a cutting device turned on and off in synchronism with the conveyance of said slat material so as to produce slats of a desired length, an input device having means for entering the length of a slat and for entering a desired height of a blind;

a control device having means for converting the output signal of said input device to pulse signals corresponding to the slat length entered and outputting them; said control device having means for calculating the number of slats required for a set of blinds on the basis of said input height of the blind and the width of a slat and means for outputting said pulse signals intermittently in a number which corresponds to said number of slats; and a motor rotated on the basis of said pulse signals output from said control device so as to convey said slat material by predetermined lengths.

2. An apparatus for cutting blind slats according to claim 1 wherein said input device having means for entering a value representing the error between said input slat length and the length of an actually cut slat and said control device having means for correcting said pulse signals in accordance with the error value entered.

3. An apparatus for cutting blind slats according to claim 2, wherein said input device has a switch which stops said motor after a first slat has been cut so as to enable the measurement of said error.

4. An apparatus for cutting blind slats according to claim 1, wherein said conveying device has a pair of feed rollers placed above and below said slat material which is curved, one of said rollers contacting the convex surface of said slat material has a flat peripheral surface and the other contacting the concave surface of said slat material has a convex peripheral surface.

5. An apparatus for cutting blind slats, including a conveying device for sequentially conveying a slat material such that in synchronism with the conveyance thereof said slat material is cut to form slats of a desired length and holes through which lift cords are passed are made at both sides of the cut portion, a frame extending in the direction of the conveyance of said slat material;

a cutting metal mold mounted on said frame;

a pair of perforating metal molds mounted on said frame on both sides of said cutting metal mold in such a manner that said pair of perforating metal molds are separated by said cutting metal mold in the direction of the movement of said slat material;

means for adjusting the position of said pair of perforating metal molds in the longitudinal direction of said frame; said position adjusting means including defining members for determining the intervals between said metal molds located on said adjusted positions by being disposed between said cutting metal mold and each of said perforating metal molds; and a mechanism for simultaneously actuating said cutting metal mold and said perforating metal molds.

6. An apparatus for cutting blind slats according to claim 5, wherein said actuating mechanism has an engaging member which commonly engages with the moving portions of said metal molds and air cylinders which drive said engaging member so as to move said moving portions of said metal molds toward said slat.

7. An apparatus for cutting blind slats, including: a conveying device for sequentially conveying a slat material; and a cutting device turned on and off in synchronism with the conveyance of said slat material so as to continuously form a plurality of slats of a desired length, means for removing said slats in one direction perpendicular to the direction of the movement of said slat material; said removing means including a plurality of air cylinders mounted in the other direction perpendicular to the direction of the movement of said slat material and in the longitudinal direction of said slats which have been cut; and means for synchronizing said removing means to the actuation of said cutting device; said synchronizing means including a valve device respectively connected to said air cylinders and said cutting device.

8. An apparatus for cutting blind slats according to claim 7, wherein said removing means further includes retrieving members for retrieving a plurality of removed slats in a state wherein they are piled on top of one another.

9. An apparatus for cutting blind slats, comprising:

a frame extending in the longitudinal direction of a slat material;

a conveying device for conveying said slat material along said frame;

a metal mold for cutting slat material so as to form slats of a predetermined length, said metal mold being disposed on said frame;

a pair of end perforating molds for making throughholes for lift cords at both sides of the cut portion of said slat material, said metal molds being disposed on said frame in the direction of the movement of said slat material in such a manner that they are separated by said cutting metal mold;

a center perforating metal mold for making a throughhole for a lift cord at the center of the length of said slat, said metal mold being disposed on said frame;

means for removing the cut slat in a direction perpendicular to the direction of the movement of said slat material after said each metal molds have been operated; and guide means for positioning said slat material in the breadthwise direction thereof before said metal molds are actuated and for allowing the movement of the slat in its removed direction after said metal molds have been actuated and before said removing means is actuated; said guide means including: a moving member supported on said frame so that it can be moved between a functioning position at which it faces one edge of the slat in the removing direction of the slat and a non-functioning position at which it is separated from said functioning position; a guiding member fixed on said frame to face the other edge of the slat; and means for driving said moving member.

10. An apparatus for cutting blind slats according to claim 9, wherein said apparatus further includes means for simultaneously actuating said each metal molds.

* * * * *